(12) United States Patent
Salem et al.

(10) Patent No.: US 9,974,089 B2
(45) Date of Patent: May 15, 2018

(54) METHODS AND SYSTEMS FOR SELECTION OF CHANNELS FOR UNLICENSED WIRELESS COMMUNICATIONS

(71) Applicants: Mohamed Adel Salem, Ottawa (CA); Amine Maaref, Ottawa (CA)

(72) Inventors: Mohamed Adel Salem, Ottawa (CA); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 14/869,697

(22) Filed: Sep. 29, 2015

(65) Prior Publication Data

US 2017/0094675 A1    Mar. 30, 2017

(51) Int. Cl.
*H04W 72/00* (2009.01)
*H04W 72/08* (2009.01)
*H04W 16/14* (2009.01)

(52) U.S. Cl.
CPC ......... *H04W 72/085* (2013.01); *H04W 16/14* (2013.01)

(58) Field of Classification Search
CPC ............... H04W 72/085; H04W 16/14; H04W 72/0406; H04W 72/0446; H04W 72/0453; H04W 72/082; H04W 72/00
USPC ...................................... 455/452.2
See application file for complete search history.

(56) References Cited

U.S. PATENT DOCUMENTS

| 7,801,490 | B1* | 9/2010 | Scherzer | H04B 17/382 |
| | | | | 370/328 |
| 9,544,792 | B2* | 1/2017 | Cheng | H04W 24/08 |

| 2009/0219912 | A1* | 9/2009 | Wengerter | H04L 47/14 |
| | | | | 370/345 |
| 2012/0039284 | A1 | 2/2012 | Barbieri et al. | |
| 2012/0077510 | A1* | 3/2012 | Chen | H04W 28/26 |
| | | | | 455/452.1 |

(Continued)

FOREIGN PATENT DOCUMENTS

WO    2012026857    3/2012

OTHER PUBLICATIONS

Berlemann, L, et al., "Unlicensed Operation of IEEE 802.16: Coexistence with 802.11(a) in Shared Frequency Bands," 2006 IEEE 17th International Symposium on Personal, Indoor and Mobile Radio Communications, pp. 1-5, Sep. 2006.

(Continued)

*Primary Examiner* — Mong-Thuy Tran

(57) ABSTRACT

Methods, devices and systems are disclosed to enable the use of unlicensed wireless channels by nodes and devices in a network, such as a mobile or cellular communications network, which primarily operates over licensed wireless channels. A selected channel, or selected channel and node pair for serving a user device are determined based on a combined metric of a signal quality level and a target time share parameter. The time share parameter represents the estimated data rate available for each potential channel, or channel and node pair, in light of the requirement to share the unlicensed wireless channel resources with other equipment. The signal quality level represents an estimated signal quality at the user device for each channel and node based on factors including residual interference from other communications signals transmitted over the unlicensed channels.

26 Claims, 7 Drawing Sheets

(56) References Cited

U.S. PATENT DOCUMENTS

| | | | | |
|---|---|---|---|---|
| 2013/0294356 A1* | 11/2013 | Bala | ............... | H04W 16/14 370/329 |
| 2013/0337821 A1* | 12/2013 | Clegg | ............... | H04L 5/0062 455/452.1 |
| 2014/0269492 A1* | 9/2014 | Forenza | ............... | H04B 7/0452 370/328 |
| 2015/0063148 A1* | 3/2015 | Sadek | ............... | H04W 28/26 370/252 |
| 2015/0063323 A1* | 3/2015 | Sadek | ............... | H04W 72/1215 370/336 |
| 2015/0085683 A1* | 3/2015 | Sadek | ............... | H04L 43/0894 370/252 |
| 2015/0085841 A1* | 3/2015 | Sadek | ............... | H04W 72/1215 370/336 |
| 2015/0163680 A1* | 6/2015 | Valliappan | ............... | H04W 16/14 370/329 |
| 2015/0163823 A1* | 6/2015 | Sadek | ............... | H04W 72/1215 370/336 |
| 2015/0223243 A1* | 8/2015 | Tabet | ............... | H04W 28/085 370/330 |
| 2015/0223244 A1* | 8/2015 | Tabet | ............... | H04W 72/12 370/329 |
| 2015/0264699 A1 | 9/2015 | Fwu et al. | | |
| 2015/0296384 A1* | 10/2015 | Sadek | ............... | H04W 16/14 455/452.1 |
| 2016/0066204 A1* | 3/2016 | Khawer | ............... | H04W 72/085 455/500 |
| 2016/0066306 A1* | 3/2016 | Khawer | ............... | H04W 72/0446 370/329 |
| 2016/0073405 A1* | 3/2016 | Khawer | ............... | H04L 5/0007 370/329 |
| 2016/0088631 A1* | 3/2016 | Hedayat | ............... | H04W 16/14 370/329 |

OTHER PUBLICATIONS

Bhorkar, Abhijeet, et al., "Performance Analysis of LTE and Wi-Fi in Unlicensed Band Using Stochastic Geometry", 2014 IEEE 25th International Symposium on Personal, Indoor and Mobile Radio Communications, pp. 1310-1314, Sep. 2014.

Qualcomm Technologies, Inc. "LTE in Unlicensed Spectrum: Harmonious Coexistence with Wi-Fi", Qualcomm Research, Jun. 2014.

* cited by examiner

US 9,974,089 B2

METHODS AND SYSTEMS FOR SELECTION OF CHANNELS FOR UNLICENSED WIRELESS COMMUNICATIONS

TECHNICAL FIELD

The present application relates to wireless communications and specifically, methods and systems for selecting a wireless resource, or selecting a node and wireless resource combination for serving a device.

BACKGROUND

Many devices currently support different types of network interfaces and communications between the device and various wireless networks. Some networks operate over a licensed wireless spectrum which is regulated and has portions allocated to different entities in a geographic area. Such networks typically are operated by a carrier or network service provider, may have access controls or service level agreements, and may require fees in order to receive services. Other networks operate by devices sharing a range of unlicensed wireless spectrum. Such networks may or may not have access controls or service level agreements, and typically do not require fees for wireless connections between devices and a network access point. Although a device may use services from both types of networks across licensed and unlicensed spectrum, these uses may not be seamless to a user, and configuration of the device by a user may be required. Further, such access may not provide an efficient use of the available licensed and unlicensed wireless spectrum.

Various systems have been proposed in order to enable a device to access and receive services from a network typically operated by a carrier or service provider over licensed frequencies, such as mobile or cellular communications networks based on 5G, 4G, and Long Term Evolution (LTE) standards and related technologies, and at the same time access and receive services from a network typically operating over unlicensed frequencies, such as wireless local area network operating according to a standard such as IEEE 802.11 or WiFi™. Rather than simply offloading some data communications to an unlicensed network, other systems aim to extend the benefits of a carrier-type air interface and services provided for mobile or cellular networks over licensed spectrum to also provide the services over the unlicensed spectrum. Such services and extensions must consider fair coexistence with other devices and networks relying on the use and availability of unlicensed spectrum, as well as fair coexistence with other service providers or carriers also extending communications into the unlicensed spectrum. These extended or assisted communications may be referred to as licensed assisted access (LAA).

SUMMARY

In one embodiment, the present application discloses a method for selection of an unlicensed wireless channel. The method includes, for a user device and one or more network nodes, determining a signal quality level associated with each of the one or more network nodes and each of two or more unlicensed wireless channels available to the user device and to that network node; and obtaining a target time share parameter associated with each of the two or more unlicensed wireless channels and each of the one or more network nodes. The method includes selecting an unlicensed wireless channel for use as a carrier by the user device, where the unlicensed wireless channel is selected based on the signal quality level and the target time share parameter. In one embodiment, the method includes jointly selecting the unlicensed wireless channel and a network node for serving the user device based on the signal quality level and the target time share parameter.

In one embodiment, the present application discloses a controller which includes a communications interface; a processor; and one or more non-transitory computer readable media having computer readable instructions stored thereon for transmitting and receiving data through the communications interface, the instructions, when executed by the processor, direct the controller to, for a user device and one or more network nodes in a wireless communications network, determine a signal quality level associated with each of the one or more network nodes and each of two or more unlicensed wireless channels available to that network node and to the user device; and obtain a target time share parameter associated with each of the two or more unlicensed wireless channels and each of the one or more network nodes. The controller is directed to select an unlicensed wireless channel for use as a carrier by the user device. The unlicensed wireless channel is selected based on the signal quality level and the target time share parameter. In one embodiment, the controller is directed to jointly select the unlicensed wireless channel and a network node for serving the user device. The unlicensed wireless channel and the network node are jointly selected based on the signal quality level and the target time share parameter.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods, devices and systems to enable the use of unlicensed wireless channels by nodes and devices in a network, such as a mobile communications network, which primarily operates over licensed wireless channels. This type of functionality may be referred to as license assisted access (LAA), wherein the benefits of a carrier-type air interface and services provided for mobile networks over a licensed spectrum are extended to also provide services over an unlicensed spectrum. Methods are described for selecting an unlicensed wireless channel for use as a secondary carrier by the user device and for selecting a network node for supporting the secondary carrier. In some existing implementations, selecting an unlicensed wireless channel involves detecting and avoiding unlicensed wireless channels with strong signal levels from equipment in other networks which use those channels. The method in the present application uses a network node in a mobile communications network which operates similarly to equipment which typically operates over the unlicensed wireless channels and relies on collision avoidance and carrier sensing functions. Collision avoidance and carrier sensing functions involve transmissions by one node or device being preceded by a preamble or other signal which is sensed by other nodes or devices. These mechanisms trigger the other nodes or devices to defer or delay transmissions over the unlicensed wireless channels in order to avoid a collision. As a result, the selection of an unlicensed wireless channel or an unlicensed wireless channel and network node may be based on an assumption that many of the potentially interfering signals from other equipment using the unlicensed wireless channels will be blocked by the transmissions by the network node. The residual interference at the user device from potentially interfering signals which are not blocked by the network node is determined for each potential unlicensed wireless channel, or for each potential unlicensed wireless channel and potential network node, which may support the secondary carrier. An estimated received signal quality level at the user device is determined based on the determined residual interference. This signal quality level is combined with a duty cycle or time share factor, and the node and channel pair having the best combined metric may be selected for supporting the secondary carrier. The duty cycle or time share factor reflects the estimated data rate available for each potential channel, or channel and node pair, in light of the requirement for sharing the unlicensed wireless channel resources with other equipment and/or networks. The selection of the unlicensed wireless channel or the selection of the unlicensed wireless channel and network node pair typically is made by the network node or a management or scheduling entity in the mobile communications network for one or more user devices.

Figure 1:
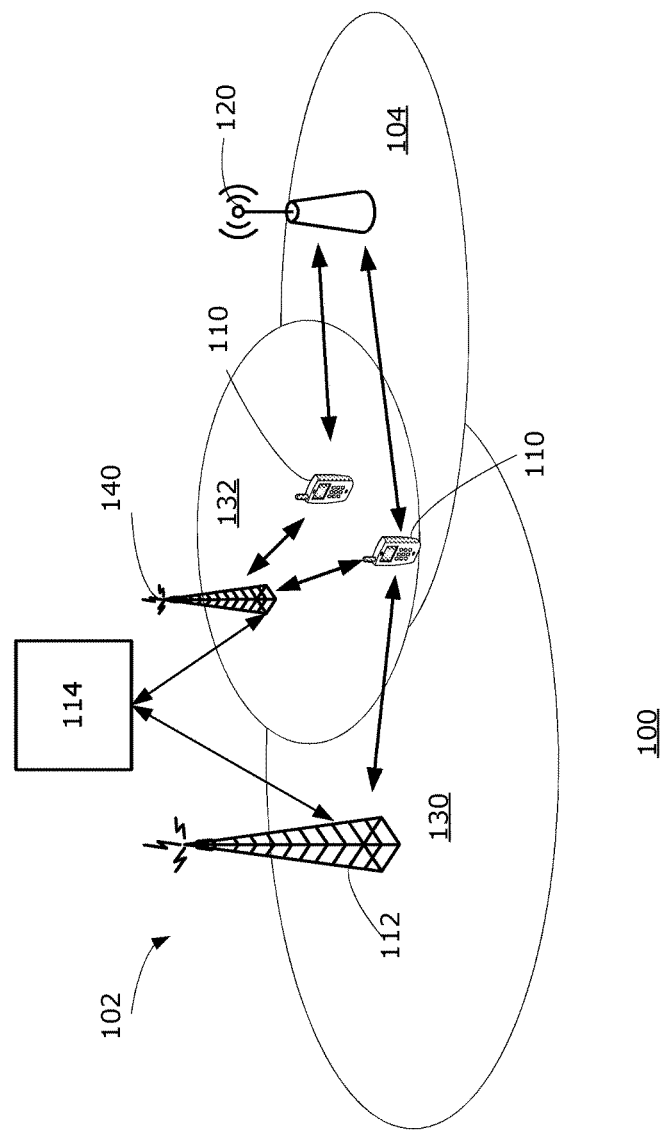
FIG. 1 is a diagram illustrating an example communications system in accordance with one implementation of the present disclosure.

FIG. 1 illustrates a communications system 100 comprising a number of different wireless networks 102, 104 which provide services to a plurality of user devices 110. The user device 110 is generally any device capable of providing wireless communications such as a user equipment (UE), wireless transmit/receive unit (WTRU), mobile station (MS), mobile terminal, smartphone, cellular telephone, or other wireless enabled computing or mobile device. The user device 110 includes one or more communications interfaces, described in further detail below, to enable the user device 110 to communicate with the networks 102, 104.

The wireless network 102 may operate according to one or more access technologies such as frequency division multiple access (FDMA), single-carrier FDMA (SC-FDMA), orthogonal FDMA (OFDMA), or sparse code multiple access (SCMA), and communications or interface standards including but not limited to fifth generation (5G) or fourth generation (4G) telecommunications networks, 3rd Generation Partnership Project (3GPP) Long-Term Evolution (LTE), or 3GPP Long-Term Evolution advanced (LTE-A). The network 102 may provide services through one or more network nodes 112. The network node 102 may be a base station (BS), evolved Node B (eNB), or other network interface which functions as a wireless transmission and/or reception point for user devices 110 in the network 102.

Each network node 112 may be connected to a backhaul network which enables data to be exchanged between the network nodes 112 and other remote networks, nodes, access points, and devices. The backhaul network may include a controller 114 which performs network management, control, or scheduling functions, or a combination of such functions, including the selection of channels and association of user devices 110 with a network node 112 as described herein. The network nodes 112 may support communications with each user device 110 by establishing uplink and downlink communications channels with each device 110. Communications in the network 102 may be unscheduled, scheduled by one or more network nodes 112 or by a scheduling or management entity (not shown), or a mix of scheduled and unscheduled communications.

The network nodes 112 may operate with different transmitting and receiving capabilities creating service areas or cells of different sizes, which may be referred to as macro cells and small cells, micro cells, pico cells or femto cells. Smaller cells may be serviced by a lower power network node (LPN). For illustration purposes, a macro-cell 130 and small cell 132 are shown in FIG. 1 with a low power network node 140 serving the small cell 132 and a network node 112 serving the macro-cell 130. One or more LPNs 140 may be connected through a wired backhaul connection (not shown) to the network node 112 serving a macro-cell 130. Wireless communications with one or more user devices 110 thus may be supported over a range from a few meters to tens or hundreds of kilometers. As a result, the frequencies used in the network 102 may be licensed or managed such that multiple networks 102 may coexist within a geographic area. Typically, each network 102 is operated by a different entity, such as a carrier or service provider. In some embodiments, the network 102 operates at frequencies in the range of 700 MHz to 2.6 GHz.

The wireless network 104 may be a wireless local area network (WLAN), such as a network operating according to the IEEE 802.11 standard or WiFi™. Services are provided through one or more network access points 120. The access point 120 may have a wired connection to a server (not shown) which enables data to be exchanged between the access point 120 and other remote networks, nodes, access points, and devices (not shown). Each access point 120 may communicate with one or more user devices 110 within a range of a few meters and multiple access points 120 may be used to extend the coverage of the WLAN network 104. While shown as separate, it will be appreciated that the user device 110 or another computer device (not shown) may also operate as an access point 120. Communications in the WLAN network 104 typically have restrictions on transmitter power and thus are local, typically extending within a home, office, building or the like. The provision of such networks is unlicensed, meaning that permission from a regulatory body is not required for a person or entity to operate a WLAN network 104, and an allocation of specific frequencies to each network operator is not required. WLAN networks 104 may operate in frequency bands between 2.4 to 6.0 GHz.

Although they are unlicensed, WLAN networks 104 may be required to comply with operational restrictions, such as limits on transmitter power, or support features required by a regulatory body in order to coexist and interoperate with other WLAN networks 104 in a particular area. These features include, for example, carrier sense multiple access (CSMA) protocols or "listen before talk" (LBT), meaning that the access point 120 attempts to sense the presence of other access points 120 or devices 110 transmitting in the WLAN network 104 and waits for the transmissions by others to end before the access point 120 attempts to send data. This provides one mechanism by which collisions in the unscheduled communications in the network 104 may be avoided. Dynamic frequency selection (DFS) may be used in order to improve shared use of the spectrum between the WLAN network 104 and other systems or apparatus (not shown) operating in the same frequency band.

The user device 110 may send and receive data through each of the networks 102, 104 but the additional communications in the WLAN network 104 over unlicensed spectrum may not be transparent to a user, may not be managed, or may be difficult to manage and utilize by an operator of the network 102, and the available unlicensed spectrum may be under-utilized. Various adaptations of channel or carrier aggregation (CA) mechanisms designed for LTE and LTE-A networks have been proposed for use in integrating communications between user devices 110 and network nodes 112, 140 over the licensed spectrum associated with networks 102, and communications between user devices 110 and network nodes 112, 140 over the unlicensed spectrum, which also may be associated with one or more WLAN networks 104. With carrier aggregation, two or more component carriers are combined to serve a user device 110 in order to increase the bandwidth for communications and/or improve the use of non-contiguous carriers.

When UEs 110 communicate over both licensed and unlicensed frequencies, carrier aggregation mechanisms involve the association of the user device 110 with a network node 112 so that the user device 110 is served by the network node 112. The user device is further configured to communicate with the network node 112 on a first component carrier (CC) as the primary component carrier (PCC) operating over a licensed frequency or channel. The combination of the network node 112 and PCC may be referred to as the primary cell (PCELL). The user device 110 may also be associated with a second network node 112, 140 and configured to communicate with the second network node 112, 140 on a secondary component carrier (SCC). The combination of the network node 112 and SCC may be referred to as the secondary cell (SCELL). Additional SCCs and SCELLs also may be configured. Depending on the features supported and performance of the network 104, the PCELL and SCELL(s) may be supported by the same network node 112, 140 or different network nodes 112, 140 which may be situated at different geographic locations. Thus, unlicensed frequencies may be used by the network 102 and operated as secondary carriers along with and controlled by a primary carrier. Due to transmit power limitations which may apply to the unlicensed spectrum, such as the spectrum associated with WLAN network 104, the user device 110 is typically associated with one or more low power network nodes (LPN) 140 serving the secondary cells.

In existing systems, the association of a user device 110 with a particular LPN 140 for supporting communications over an unlicensed wireless channel in a secondary cell has been achieved by selecting the same LPN 140 which supports communications for the user device 110 over the licensed channel in the primary cell. The LPN 140 for the primary cell may be selected, for example, based on the maximum received Reference Signal Received Power (RSRP) in the licensed spectrum for the user device 110 in the primary cell. The selection of a particular carrier, frequency or channel for use by the user device 110 in the unlicensed spectrum has been made randomly in some systems. In other systems, a selection is made based on the channel with the least total power or energy detected from other sources transmitting on that channel, regardless of the type of technology used to transmit signals. The determination of which channel has the least total power or energy may be made by the LPN 140. Alternatively, a selection is made based on the unlicensed channel with the least total power or energy as detected by the user device 110.

Figure 2:
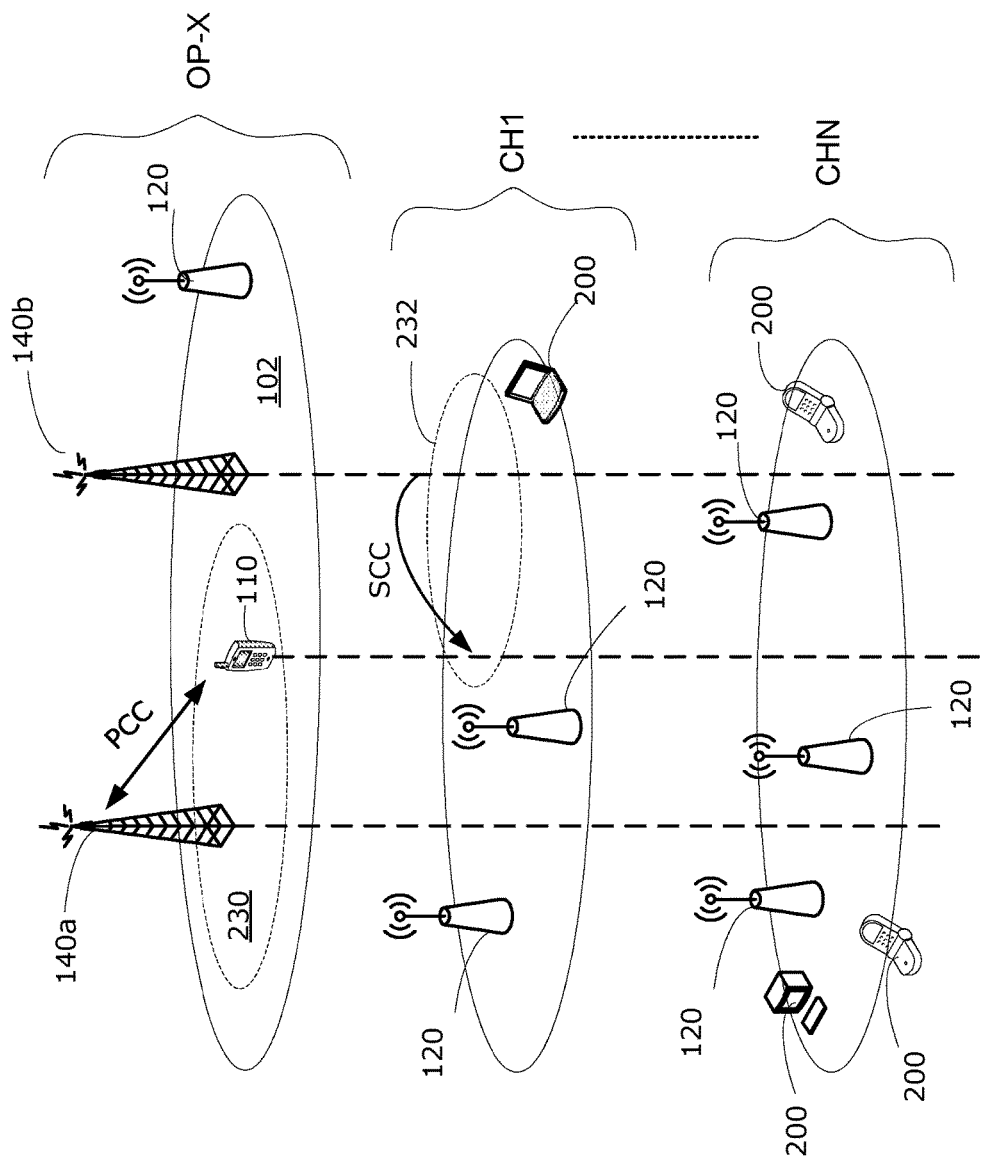
FIG. 2 is a diagram illustrating an example communications system in accordance with one implementation of the present disclosure.
Figure 3:
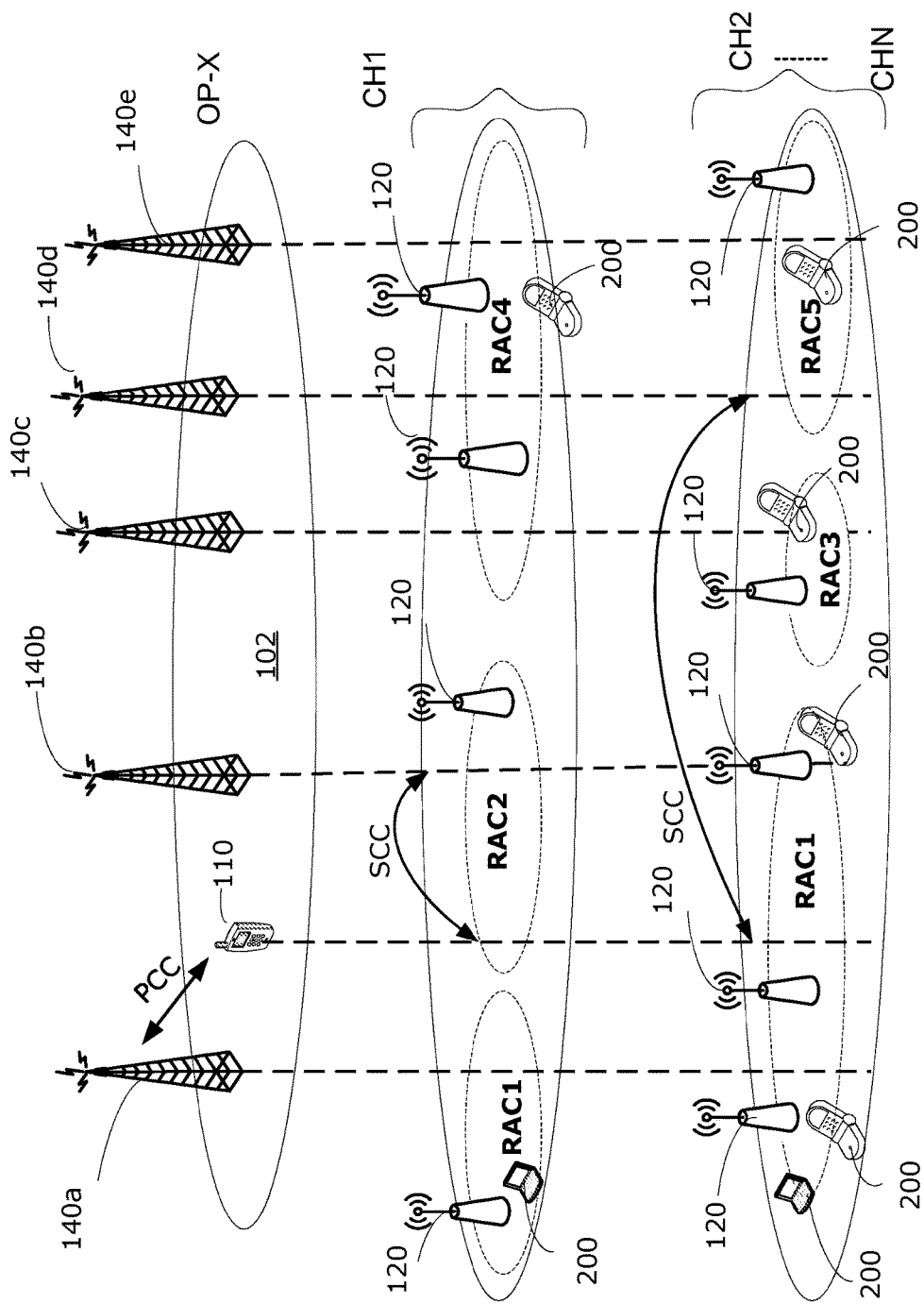
FIG. 3 is a diagram illustrating an example communications system in accordance with one implementation of the present disclosure.
Figure 4:
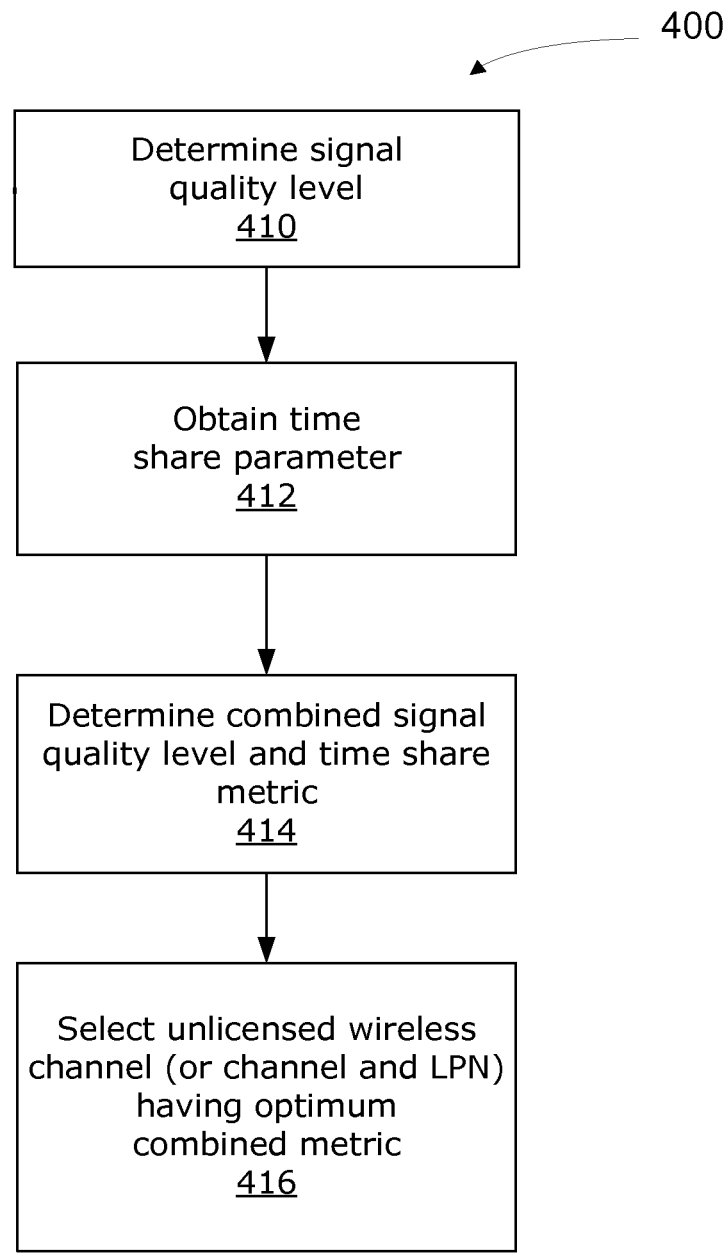
FIG. 4 is a block diagram illustrating a method in accordance with one implementation of the present disclosure.

Embodiments of the present application will be described based on examples illustrated in FIGS. 2 and 3 which illustrate a network 102 and a number of unlicensed wireless channels, CH1 through CHN, which may be used by the network 102 to support additional communications with the user device 110. The unlicensed wireless channels CH1-CHN may support communications for other networks 104 and equipment 200. Equipment 200 may include access points 120, as described above, and other user devices 110, whether mobile or stationary, which have a communications interface and transmitter capable of operating in a network 104, such as a WLAN or WiFi network. Although reference will be made to FIGS. 2 and 3 to discuss different signal strengths, distances or relationships between various apparatus, the apparatus and locations or distances in FIG. 2 are representative only and are not to scale. FIGS. 2 and 3 are intended to illustrate that different apparatus may be configured to use, and may be actively transmitting data over, various unlicensed wireless channels. To improve the clarity of the figures, the coverage areas of networks 104 are not identified in FIGS. 2 and 3.

As illustrated in FIG. 2, communications in the network 102 occur over one or more licensed wireless channels. The network 102 may be operated by a service provider or operator OP-X. The user device 110 may be associated with an LPN 140*a* which supports a primary component carrier (PCC) in a primary cell 230. A selected unlicensed wireless channel may be configured as a secondary component carrier (SCC) in a secondary cell 232 which is supported by a selected LPN 140*b*. Thus, the bandwidth available to the user device 110 may be increased and at the same time managed or assisted by the operator OP-X of the network 102. Depending on the network 102, this license-assisted access (LAA) may support additional communications though the SCC only in the downlink, referred to herein as LAA supplemental downlink (LAA-SDL), or license-assisted access may support both uplink and downlink communications, referred to herein as LAA carrier aggregation (LAA-CA).

The present application describes new methods for selecting an unlicensed wireless channel for use as the secondary carrier by the user device 110 and for selecting the LPN 140 from among a number of potential LPNs 140 for association with the user device 110 and for serving the secondary carrier in the secondary cell 232. In some embodiments, both the unlicensed wireless channel and the LPN 140 are selected, as described herein, and may be selected jointly. For example, a selection may be made based on the potential LPN 140, and an unlicensed wireless channel, having the best combined metric for serving the user device 110. In other embodiments, due to the features and services supported by the network 102, the LPN 140 serving the secondary cell may be required to be the same LPN 140 which is serving the primary cell over a licensed wireless channel.

In this scenario, only the unlicensed wireless channel is selected based on the best combined metric for the potential channels and that network node 140.

A method 400 according to one embodiment of the present application is illustrated in FIG. 3 in which the unlicensed wireless channel, or the unlicensed wireless channel and the LPN 140, are selected from the available channels and potential LPNs 140 based on a signal quality level in combination with a target time share parameter for each user device 110, potential LPN 140, and available channel combination. The method 400 may be performed by a controller or management entity in the network 102, as described further below, which may be a separate component in the network 102, or part of a network node 112 or LPN 140. An overview of the method 400 is provided below, followed by more detailed descriptions of certain aspects or variations of the method 400.

The method 400 includes determining a signal quality level at Action 410. The signal quality level may be determined for the user device 110 for each potential LPN 140 and one or more unlicensed wireless channels available for use by the user device 110 and that potential LPN 140. The available channels may include all possible channels in the WLAN network 104 or a subset of the possible channels. The signal quality level represents an estimated signal power at the user device 110 in light of residual interference which may exist at the user device 110 for each unlicensed wireless channel and potential LPN 140 due to signals being transmitted in other networks 104. As described herein, the residual interference is determined based on signals transmitted over an unlicensed wireless channel which are not expected to be blocked or prevented by transmissions by the potential LPN 140 over that unlicensed wireless channel. Thus, for each user device 110 and potential LPN 140, a total of N signal quality levels for N possible or candidate unlicensed wireless channels may be determined. In some embodiments, the signal quality level also reflects interference from other LPNs 140 and user devices 110 which are engaged in LAA communications over the unlicensed channels in the network 102, or in other networks 102 controlled by other operators.

The target time share parameter is obtained at Action 412 for each LPN 140 potentially serving the user device 110 and each of the unlicensed wireless channels available for use by the user device 110 and that LPN 140. Thus, for each potential LPN 140, a total of N target time share parameters may be determined. The target time share parameter represents the time or fraction of resources available to the LPN 140 for use of the unlicensed wireless channel in order to maintain a fair coexistence with the equipment 200 which also relies on the use of the unlicensed wireless channel. In some embodiments, the time share parameter also reflects the requirements of other user devices 110 and LPNs 140 which are also configured to share the use of the same unlicensed wireless channel. The target time share parameter may be a percentage or may be represented as a factor between 0 and 1, with 0.5 representing an even time or radio resource share between the LPN 140 and other equipment 200 using a particular unlicensed wireless channel.

The target time share parameter and signal quality level may be combined at Action 414 and a metric determined for each potential LPN and unlicensed wireless channel available to the user device 110. The metric may be determined for each potential LPN 140, and for each channel available to each potential LPN 140. Thus, a potential LPN 140 and available channel with a strong or high signal quality level may have a low metric due to having a low time share parameter. The data rate achievable for the user device 110 over that potential LPN 140 and channel may be comparable to a potential LPN 140 and available channel having a similar metric based on a weak or low signal quality level and a high time share parameter.

Based on the metric of the combined signal quality level and the target time share parameter, an unlicensed wireless channel and an LPN 140 are selected at Action 416. In one embodiment, the selected channel and LPN 140 are based on the channel and potential LPN 140 pair having the highest combined metric. Where the user device 110 is required by the network 102 to be associated with the same LPN 140 for the primary cell and for the secondary cell, Action 416 includes selecting only the available channel at that LPN 140 having the highest combined metric of the target time share parameter and signal quality level. When the signal quality level and time share parameter are combined and considered for the selection of an unlicensed wireless channel, or the selection of both an unlicensed wireless channel and an LPN 140, this enables an increased efficiency and fairness for the operation of the user device 110 over the unlicensed wireless channel in order to improve the maximum achievable data rate at the user device 110. In some embodiments, multiple or M pairs of LPNs 140 and channels may be selected for a user device 110 using the pairs having the best or maximum metric values, or pairs having a metric value above a particular threshold. As described below, once a pair is selected, an SCC may be configured at the user device 110 for potential use but remain idle until activated. In one embodiment, the metric of the combined signal quality level and the target time share parameter is determined for the upcoming window of time for all potential combinations or potential SCCs including an SCC currently in use. If the LPN 140 and channel pair having the best combined metric is the pair currently in use, messages to reconfigure the SCC are not required unless there is a change in the primary cell for the user device. In some embodiments, if the metrics of the combined signal quality level and the target time share parameter associated with multiple LPNs and channels are the same, priority may be given to the LPN 140 currently serving the user device in the primary cell, or to the LPN 140 and channel on which the SCC is configured currently. Alternatively, where multiple combinations of LPNs 140 and channels have the same metrics, or metrics within a particular range or threshold, a selection may be made randomly.

If the method 400 is performed by a network node 112 in a macro-cell, or an LPN 140, the target time share parameter may be obtained at Action 412 by receiving the target time share parameter from a network management or control entity, such as the controller 114. Where the method 400 is performed by the controller 114, the target time share parameter may be obtained from a determination made by the controller 114. The time share parameter may consist of a duty cycle which is configured for each LPN 140, or for each unlicensed wireless channel at each LPN 140. In some embodiments, the time share parameter may be updated or adjusted dynamically. The target time share parameter is used in the network 102 in order to ensure a fair coexistence and use of the unlicensed spectrum. The time share parameter may impose a gating or duty cycle mechanism such that on any particular unlicensed channel, communications for the network 102 share the wireless resources with other systems, such as the WLAN network 104, and/or another network 102 operated by a different service provider. In some embodiments, the time share parameter represents the percentage or proportion of time during which unlicensed wireless channels may be used by the network 102 and LPNs 140 and user devices 110.

One time share mechanism has been proposed for future or 5$^{th}$ generation (5G) networks, as described in co-pending U.S. application Ser. No. 14/568,703, filed Dec. 12, 2014 and entitled METHOD AND SYSTEM FOR JOINT COORDINATION AND COEXISTENCE IN UNLICENSED SPECTRUM, and co-pending U.S. application Ser. No. 14/568,743, filed Dec. 12, 2014 and entitled METHOD AND SYSTEM FOR DYNAMIC OPTIMIZATION OF A TIME-DOMAIN FRAME STRUCTURE, both of which are herein incorporated by reference. The use of any given unlicensed channel is granted on a basis which achieves an estimated or target proportion of use of the unlicensed channel, designated as a Soft Air Time share (SAT). The proposed functionalities consider different time scales including an observation period on the order of minutes ($T_{obs}$); a coordination period on the order of hundreds of milliseconds to thousands of milliseconds ($T_{coord}$); and a Quality of Service (QoS) optimized coexistence period on the order of milliseconds. If the LPN 140 is granted access to use an unlicensed channel, a sequence of time-multiplexed coexistence frames may be dynamically configured based on QoS requirements such that the overall target SAT share is achieved for a secondary cell on that unlicensed channel. In further embodiments, one or more LPNs 140 may be associated in a temporary Radio Access Cluster (RAC) and permission or access to use an unlicensed wireless channel is granted to and scheduled for the RAC in order to achieve the overall target SAT.

The signal quality level described above may be determined at Action 410 in a number of ways. In some embodiments, the signal quality level is determined based on passive sensing, measuring or monitoring of signals and information over the unlicensed wireless channels obtained from both the potential LPN 140 and the user device 110. The signal quality level may be determined based on reports of the signal quality and information obtained from the user device 110 and the potential LPN 140. Where the Action 410 is performed by the potential LPN 140, the reports are obtained from the signal quality and information determined by that potential LPN 140.

When coexisting with other networks 104 over the unlicensed wireless channels, the LPN 140 may be configured to operate in some aspects similar to an access point 120 or other equipment 200. This enables the LPN 140 to block or prevent transmissions by equipment 200 and avoid collisions with unscheduled communications over the unlicensed channels. In essence, in order to coexist, the LPN 140 attempts to behave or appear as another WLAN network 104. The LPN 140 may have carrier sensing functionality and precede a downlink transmission with a preamble signal which is recognized in the network 104. This invokes physical carrier sensing and prevents transmissions by equipment 200 in the network 104. The LPN 140 may be capable of invoking virtual carrier sensing mechanisms, such as the WiFi network allocation vector (NAV) which triggers equipment 200 in the network 104 to defer from accessing an unlicensed wireless channel for a particular time period. When invoked prior to transmission from the LPN 140, the NAV mechanism allows both uplink and downlink transmissions to occur for the user device 110 and LPN 140, which is suitable for LAA-CA. The physical carrier sensing mechanism may be limited to enabling downlink transmissions from the LPN 140 for LAA-SDL.

In some embodiments, both the LPNs 140 and the user device 110 are configured to passively sense, measure or monitor the presence of beacons, reference signals, or signal preambles generated in networks 104 and transmitted over the unlicensed wireless channels. For example, the LPN 140 may be configured to detect WiFi beacons and preambles, including beacons and preambles above a carrier sensing threshold. This enables the LPN 140 to identify equipment 200 operating in the network 104 and surrounding or detectable by the LPN 140, such as access points 120 in the vicinity of the LPN 140, their respective signal powers, and their served traffic or access categories (AC) per unlicensed channel. This sensing may be conducted periodically, such as every $T_{coord}$ period. As a result, the LPN 140 may estimate its footprint on each available unlicensed wireless channel. The footprint consists of the potentially blocked equipment 200, including access points 120, and impacted load if the LPN 140 transmits on that unlicensed wireless channel using its nominal transmit power. The information gathered by each LPN 140 may be sent as an LPN carrier sensing report (LPN CS report) to a network controller, or to a network node 112 for a macro-cell, for use in determining the signal quality level and selecting a channel, or a channel and node, as described herein. In other embodiments, the information gathered by an LPN 140 may be used by that LPN 140 for selecting a channel for use as the secondary carrier associated with that LPN 140.

The user device 110 also may be configured to detect WiFi beacons and preambles, such as beacons and preambles above a carrier sensing threshold. This enables the user device 110 to sense or measure and report information about equipment 200, including access points 120, which may be in the vicinity of the user device 110. Such information may include an equipment identifier and signal power for each unlicensed wireless channel. Although the information from the user device 110 may include some of the same access points 120 and equipment 200 in the vicinity of a potential LPN 140, it will be appreciated that depending on the location of the user device 110, it may encounter different transmissions over the unlicensed wireless channels, such as transmissions from hidden access points 120 in the network 104. This sensing by the user device 110 also may be conducted periodically, such as every $T_{coord}$ period. The user device 110 may provide a carrier sensing report (device CS report) to the network 104 in order to enable the selection and optimization of selected unlicensed wireless channels and LPNs as described herein for serving the user device 110. The CS report may be transmitted by the user device 110 during uplink communications on its PCC for LAA-CA or LAA-SDL communications. In other embodiments, the CS report may be transmitted by the user device 110 during uplink communications on an established SCC over an unlicensed wireless channel for LAA-CA communications. In some embodiments, the CS report is transmitted to the network 102 before the forthcoming frame or duty cycle period. In some embodiments, as described below, the CS report may be generated by the user device 110 through the use of a network interface in the device 110 which is configured to support communications over the WLAN network 104 and thus already performs some carrier sensing functions. In other embodiments, the CS report may be generated by a sensing module configured to support LAA over unlicensed wireless channels.

Based on the CS reports obtained from a potential LPN 140 and from the user device 110, a residual interference at the user device 110 for each unlicensed wireless channel available to the user device 110 and that potential LPN 140 may be determined. The CS reports from the user device 110 may identify a first group of equipment sensed or measured by the user device 110 over each of a number of unlicensed wireless channels. The CS information from the potential LPN 140 may identify a second group of equipment sensed or measured by the potential LPN 140 over each of the unlicensed wireless channels. In one embodiment, the identities of equipment 200 in each of the first and second sets of equipment may be represented by a WiFi service set identification (SSID). Based on the assumption that any equipment 200 in the second group of equipment for a particular unlicensed wireless channel would be blocked by transmissions by that potential LPN 140 over that channel, an estimated interference or residual interference is determined based on any equipment 200 whose transmissions are not blocked. For reference herein, the term residual equipment is used to signify any item of equipment 200 in the first group of equipment for that particular channel, as reported by the user device 110, which is not present in the second group of equipment for that channel, as reported by the potential LPN 140. The residual interference thus represents the residual signals or noise expected from neighbouring equipment 200 in a WLAN network 104 which may impact communications over an unlicensed wireless channel at the user device 110. The residual interference is denoted herein as $I^{WLAN\_residual}$ and may be determined as the sum of interference from each item of residual equipment for a particular channel and potential LPN 140 and user device 110.

In one embodiment, the signal quality level may be expressed as a ratio of the reference received power at the user device 110 over the residual interference described above. The received power may consist of a reference signal received power (RSRP) measurement which is determined and reported by the user device 110 to the network 102. In one embodiment, prior to determining the signal quality level, the RSRP measurement may be adjusted to account for frequency differences between the licensed wireless channel in the network 102 over which the measurement may be made and the frequency of each potential unlicensed wireless channel which may be selected for the secondary carrier for the user device 110. In other embodiments, the received power measurement is made by the user device 110 based on signals received from one or more LPNs 140 over one or more of the unlicensed wireless channels. Similar to the device CS reports described above, the received power measurements from the user device may be transmitted during uplink communications on its PCC for LAA-CA, or LAA-SDL communications or during uplink communications on an established SCC over an unlicensed wireless channel for LAA-CA communications.

In some embodiments, as noted above, one or more LPNs 140 may be part of a temporary Radio Access Cluster (RAC) for a particular unlicensed wireless channel. The establishment of RACs may be used to manage and coordinate transmissions in one or more networks 102 over the unlicensed wireless channels. One or more RACs may be established for each unlicensed wireless channel, CH1-N as illustrated in FIG. 3. For example, for wireless channel CH1, RAC4 may consist of LPNs 140c, 140d and 140e; and RAC2 may consist of LPN 140b. For wireless channel CH2, a separate RAC1 may consist of LPNs 140a and 140b. Depending on the selection of channel and LPN 140 chosen for a secondary carrier for a user device 110, as described above, the selected LPN 140 may be added to an existing RAC for the selected channel, or a new RAC may be formed for that LPN 140 and selected channel. Thus, for example, if LPN 140b and CH1 are determined to be the optimum pair to serve the user device 110, a new RAC2 may be formed for that channel and LPN. If an additional SCC is configured for the user device 110, a second optimum pair of LPN 140d and CH2 may be selected and the LPN 140d may join LPN 140e in RAC5.

The grouping of LPNs in one or more RACs may be taken into account when determining the target time share parameters and signal quality levels described above. First, the target time share parameter may include a consideration of the time or rate available to a RAC for a potential LPN 140 and unlicensed wireless channel. This reflects the fact that the use of a selected unlicensed wireless channel for a secondary carrier for the user device 110 will be impacted by the number of other LPNs 140 and SCCs which are part of the RAC. Where an LPN 140 is part of multiple RACs and serving a user flow over the multiple channels for these RACs, the load of the user flow is also divided over the multiple channels. In one embodiment, the target time share parameter may be expressed as:

$$= \frac{RACLoad_{l,n}/m}{RACLoad_{l,n}/m + CoexAdj * FootprintLoad_{l,n}}$$

with l representing the LPN index; n representing the channel index; and m representing the total number of unlicensed channels used in the RAC. The load for a particular LPN 140 and channel ($RACLoad_{l,n}$) is normalized over the number of channels m in the RAC and the target time share parameter is determined as a percentage of this load plus the load of the entire footprint ($FootprintLoad_{l,n}$). Where the RAC consists of more than one LPN 140, the $FootprintLoad_{l,n}$ consists of the load of the union set of individual LPNs 140. In one embodiment, the $FootprintLoad_{l,n}$ includes an estimation by the LPN 140 of the load from the access points 120 or other equipment 200 operating over the unlicensed wireless channel within the footprint area. The estimated load may be determined in a semi-static manner based on a measured spectrum utilization of the sensed access points 120 or other equipment 200 within the footprint area. The $FootprintLoad_{l,n}$ is multiplied by a factor of CoexAdj which represents a scaling factor. The CoexAdj is a factor used to adjust the target time share parameter and emphasize or de-emphasize the blocked WLAN load when determining the target time share parameter. The CoexAdj may be preconfigured and in some embodiments updated dynamically depending on conditions or changes in the network 102. In one embodiment, where the user device 110 may be associated with an LPN 140 which currently is part of a RAC for the particular channel, determining the target time share parameter may include re-determining this parameter based on the potential new load for the user device 110 versus the RAC footprint load.

When determining the signal quality level for one or more potential LPNs 140 which are part of an RAC, the residual interference at the user device 110 may be determined taking into account the equipment 200 which is blocked by any transmission by the RAC. As described above, signal measurements or CS reports from the user device 110 may identify a first group of equipment sensed, measured, or monitored by the user device 110 over each of a number of unlicensed wireless channels. Signal measurements or CS reports from the LPNs 140 which are part of the RAC may identify a third group of equipment sensed, measured, or monitored by the LPNs over each of a number of unlicensed wireless channels. The residual equipment in this embodiment consists of any item of equipment 200 in the first group of equipment for a particular unlicensed wireless channel, which is not present in the third group of equipment for that particular unlicensed wireless channel. As in the previous embodiments, the residual interference represents the residual signals or noise expected from neighbouring equipment 200 in a WLAN network 104 which may impact communications over an unlicensed wireless channel at the user device 110. With the presence of a RAC, however, the signal quality level and residual interference also take into consideration the potentially expanded footprint or area of the RAC with multiple LPNs 140 which may block or prevent more equipment 200 from transmitting over the particular unlicensed wireless channel.

The signal quality level may be expressed as:

$$\min\{\mu_{max}, \log_2(1+\bar{\gamma}_{l,n,k})\}$$

with:

$$\bar{\gamma}_{l,n,k} = \frac{P^{rx}_{l,k}}{\sum_{i \in RACs_n} I^{SGU}_{i,n,k} + \sum_{j \in J_{k,n}} I^{residual}_{j,n,k} + noise}$$

In the above equations, $p_{max}$ represents the maximum spectral efficiency supported by the modulation and coding scheme; $P^{rx}$ represents the received power, such as RSRP, for a particular LPN 140 and user device 110 denoted by k; and $I^{WLAN\_residual}$ represents the residual interference from one or more equipment 200, identified by index j, for a particular channel n, user device 110 k and potential LPN 140, based on the footprint of the LPN 140 or a RAC as described above.

As noted, the signal quality level also may include a noise parameter or measurement based on thermal noise and background interference that is not identified by the user device 110 from other coexisting networks 102, 104 that are managed by other network operators over the unlicensed wireless channels or from the same network 102 in which the user device 110 is operating on a particular channel n.

In some embodiments, the signal quality level may reflect an additional source of interference noted as $I^{LAA}$ above, for each RAC, channel and user device 110. This represents an estimated level of additional interference at the user device 110 from neighbouring LPNs 140 already providing LAA services on a particular unlicensed wireless channel. It will be appreciated that the determination of the additional interference due to LAA services and inclusion of this parameter in determining the signal quality level is not limited to implementations with LPNs being part of a RAC for a particular unlicensed wireless channel. In one embodiment, this LAA interference is determined based on measurements of uplink sounding or reference signals sent over a PCC using a licensed channel in the network 102. Where LAA-CA is supported, the LAA interference may be determined based on uplink sounding or reference signals sent during the uplink portion of the LAA-CA over an SCC which has already been established over an unlicensed wireless channel. The measurements may be adjusted to account for frequency differences between the measurement channel and each potential unlicensed wireless channel.

Together, the combined target time share parameter and signal quality level for a particular user device 110 (k), potential LPN 140 (l), and channel (n) may be expressed as:

$$Metric_{l,n,k} = \frac{RACLoad_{l,n}/m}{RACLoad_{l,n}/m + CoexAdj * FootprintLoad_{l,n}} \min\{\rho_{max}, \log_2(1+\bar{\gamma}_{l,n,k})\}$$

Thus, the optimum pairs of LPNs 140 and channels may be selected which have the highest load-based achievable Soft AirTime share (SAT). The optimum pairs of LPNs 140 and channels also have the lowest residual interference from any equipment 200 in one or more WLAN networks 104. As described above, the residual interference is estimated by removing from consideration any equipment 200 which is expected to have its transmissions blocked by a transmission over that resource pair. The optimum pair of LPN 140 and unlicensed wireless channel may be represented as:

$$(l^*, n^*) = \underset{l,n}{\operatorname{argmax}} \ Metric_{l,n,k}.$$

In a further embodiment, the combined metric for the potential LPN 140 and a particular unlicensed wireless channel may include an additional factor in order to take into account load balancing among SCELLS configured for an unlicensed wireless channel of different LAA LPNs 140. The optimization process may factor the existing load of the candidate or potential LPN 140 or RAC as a bandwidth share parameter (BWshare). The revised metric may be expressed as:

$$(l^*, n^*) = \underset{l,n}{\operatorname{argmax}} \ \{BWshare^k_{l,n} \times Metric_{l,n,k}\}$$

The bandwidth share parameter upon adding the user device 110 would be proportional to the ratio of that user load to the updated total load including the load of user device 110. For example, in the case of homogeneous data flows, the updated total load would be the number of user devices 110 or Radio Network Temporary Identifiers (RNTIs) served by the SCELL plus one. The bandwidth share would be thus expressed as the reciprocal of the updated total load. In the case of heterogeneous data flows, the updated total load may be a weighted sum of required long term rates. The bandwidth share would be thus proportional to the ratio of the required long term rate of user device 110 to the updated total load. Thus, the load among LPNs serving one or more SCELLS over unlicensed wireless channels may be balanced independently from the load balancing of the PCC over the licensed wireless channel. It will be appreciated that the SAT and BWshare may be determined as absolute values or as relative weights or parameters.

In one embodiment, once an unlicensed wireless channel, or an unlicensed wireless channel and LPN 140, are selected for use by the user device 110, the user device 110 is configured, but not activated, through signalling in the network 102 to use the unlicensed wireless channel and the LPN 140. The selected unlicensed wireless channel may be activated by further signalling, such as MAC layer signalling to the user device 110. For example, if a RAC is granted access to the unlicensed wireless channel, the user device 110 may receive a command from its serving LPN 140 through communications over a licensed channel to activate the configured unlicensed channel. In some embodiments, the user device 110 may receive a command to deactivate an unlicensed wireless channel based on, for example, the traffic load for the user device 110, or due to a handover of the user device 110 from a source primary cell to a target primary cell.

The method 400 to select an unlicensed wireless channel, or an unlicensed wireless channel and LPN 140 pair, may be triggered by a number of events including a user device 110 being handed over to a new network node 112 or LPN 140 and cell, or in response to a request to offload traffic for the user device 110 to an unlicensed wireless channel. In one embodiment, once configured, or configured and activated, the selected unlicensed wireless channel and selected node may be changed, or new selections may be determined, based on one or more triggers. For example, where the user device 110 is mobile and moves or is handed over from a source primary cell to another cell or target PCELL, the selection process may be repeated to determine a new selected unlicensed wireless channel, or new selected LPN 140 and unlicensed wireless channel. The selection process may be repeated periodically in order to adapt to and reflect changes to the equipment 200 and networks 104 sharing the unlicensed wireless channels. In one embodiment, the selection process is repeated for every coordination frame in the network. The selection process may also be repeated upon a decision by the network 104 to offload traffic or communications for the user device 110 to the unlicensed wireless channels.

In some embodiments, particularly where expected interference from neighbouring LPNs 140 supporting LAA services over the same unlicensed wireless channel is included as part of the signal quality level, triggering the selection process periodically for all user devices 110 may create a causality challenge, because it would require information about interference from user devices 110 that have not yet been allocated resources. The metric of the combined signal quality level and target time share parameter for a potential channel and node pair may be based initially on an approximation of the number of other nodes which may select the particular unlicensed wireless channel. As a result, the starting point or first user device 110 which is considered when determining the combined metric and may not receive the best possible selected unlicensed wireless channel and network node because inaccurate or no LAA interference would be considered for the potential network node and unlicensed wireless channels considered for the one or more selections made for the first user device. The selected channel and node may be less optimal because the selection is based on a less accurate approximation of the use of the selected channel by other nodes. Thus, different methods may be used to ensure a randomly selected user device 110 and starting point among all user devices. Additionally, the combined signal quality level and target time share parameter for multiple pairs of a potential LPN 140 and unlicensed wireless channel for each user device 110 may not be determined consecutively. In one embodiment, a technique is introduced to enable periodic triggering of the process with L representing the maximum number of LPNs 140 that a user device 110 may associate with, and the number of association and selection pairs (events) per user device 110 represented by L×m (where m corresponds to the number of unlicensed channels used in the RAC as defined above). The metric of the combined signal quality level and target time share parameter may be optimized sequentially for user devices 110 in a randomly interleaved manner. Thus, for K user devices 110, there may be a total of L×m×K events which may be listed in a random sequence each time a new selection process is triggered, thus providing a causal LAA LPN to LPN interference estimate.

Figure 5:
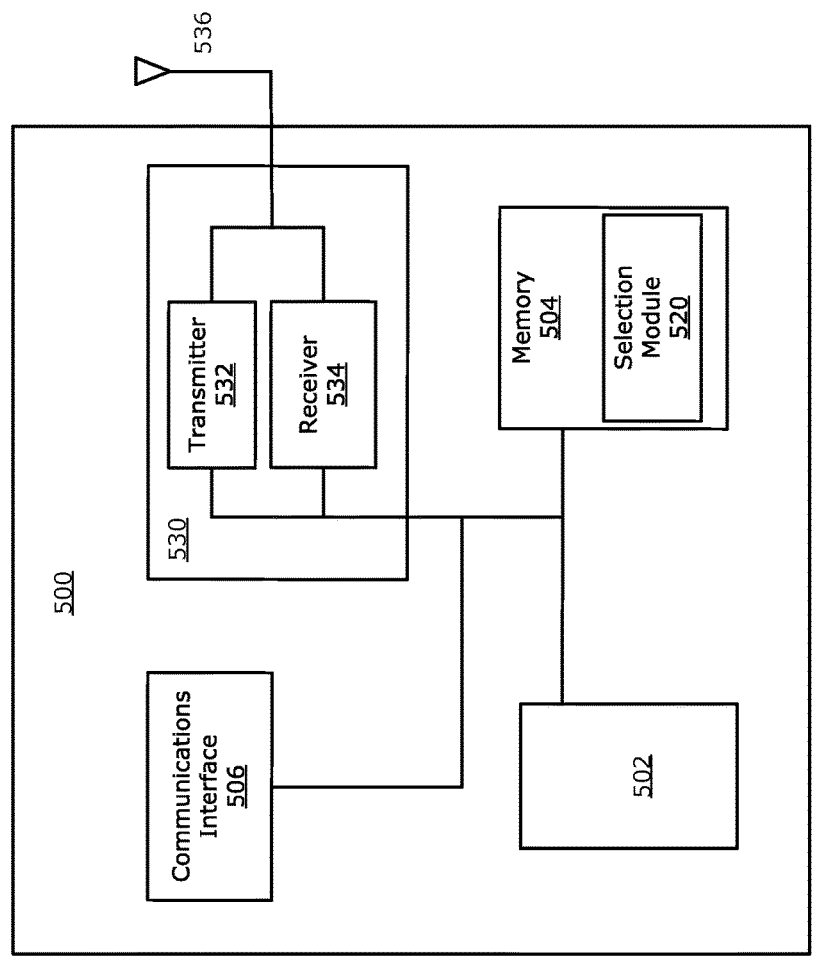
FIG. 5 is a block diagram illustrating a user device in accordance with one implementation of the present disclosure.

FIG. 5 illustrates a network node 500 according to an embodiment of the present application. The network node 500 may include one or more processing devices 502, such as a processor, a microprocessor, an application-specific integrated circuit (ASIC), a field-programmable gate array (FPGA), a dedicated logic circuitry, or combinations thereof. The network node 500 may have a memory 504, and a communications interface 506 for sending and receiving data to a backhaul network. The memory 504 may include a volatile or non-volatile memory (e.g., a flash memory, a random access memory (RAM), and/or a read-only memory (ROM)). The memory 504 may consist of a transitory computer readable media such as a RAM, a ROM, an erasable programmable ROM (EPROM), an electrically erasable programmable ROM (EEPROM), a flash memory, a CD-ROM, or other portable memory storage. The memory 504 may store instructions for execution by the processing device(s) 502, such as to carry out the present disclosure including sending and receiving data to/from a user device 110, and to/from the backhaul network, as well as instructions for the carrier aggregation methods described above for operation over licensed wireless channels, or a combination of licensed wireless channels and unlicensed wireless channels. The memory 504 may include other software instructions, such as for implementing an operating system and other applications/functions.

In one embodiment, the network node 500 includes a selection module 520 comprising instructions for implementing and supporting the methods described above. In one embodiment, the network node 500 and selection module 520 are configured to carry out the functions of a control system 700, as described below, to support the selection of unlicensed wireless channels for use as secondary carriers in the network 102, and to support the selection of a network node, such as an LPN 140, for serving the carrier. In some embodiments, the network node 500 is an LPN 140 and is configured to support a small cell and the selection of unlicensed wireless channels for one or more user devices 110 which are associated with the LPN 140. In other embodiments, the network node 500 is connected to a controller 114 in the backhaul network and the controller 114 determines the selection of nodes 500 and unlicensed wireless channels.

The network node 500 also includes a wireless communications interface 530 for communication with one or more user devices 110, as represented in FIG. 5 by a transmitter 532 and receiver 534 coupled to an antenna 536. It will be appreciated that the functions of the wireless communications interface 530 may be carried out by different transceiver or modem components including multiple transmitter, receiver and antenna components or arrays. Although FIG. 5 shows a single instance of each component, there may be multiple instances of each component in the network node 500. The network node 500 and wireless communications interface 530 may be configured to sense, measure or monitor the presence of beacons, reference signals, or signal preambles transmitted over multiple unlicensed wireless channels and generate reports of these signals, as described herein, which may be used by the network node 500 for the selection of a node and channel to support an SCC, or which may be sent to the controller 114. Depending on the configuration of the network node 500, and in particular the configuration or capabilities of the wireless interface 530, transmitter 532 and receiver 534, the network node 500 may be a low power node (LPN) 140 or a network node 112 in a macro-cell as described above.

Figure 6:
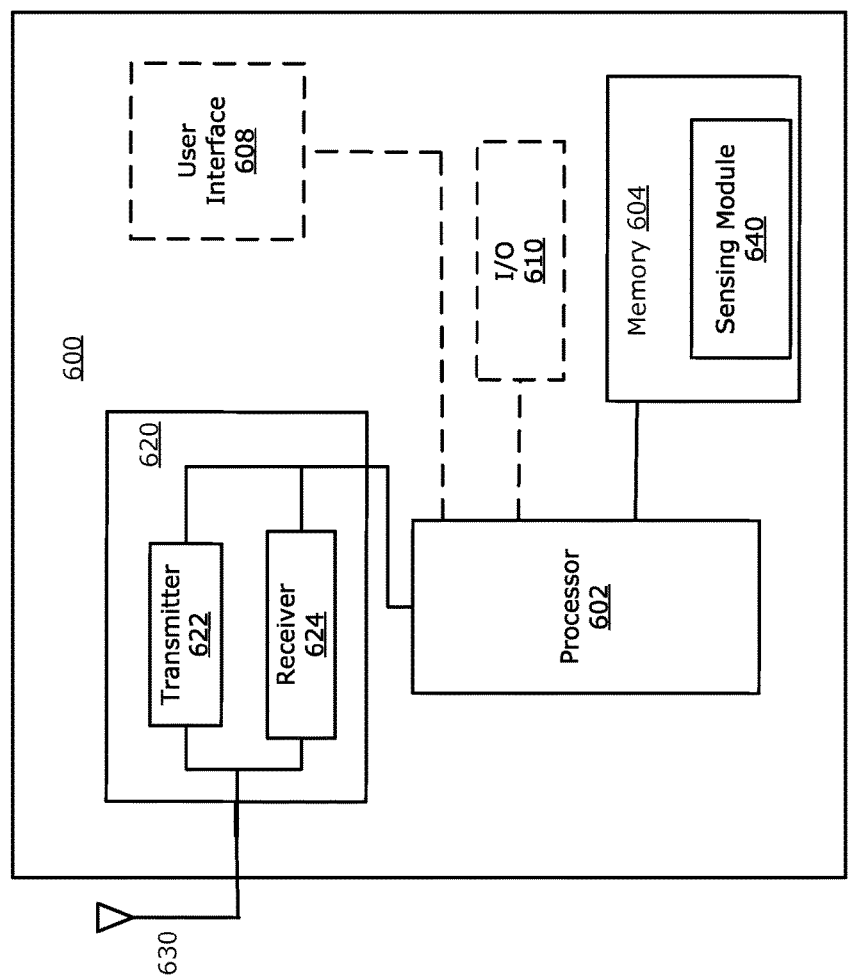
FIG. 6 is a block diagram illustrating a network node in accordance with one implementation of the present disclosure.

FIG. 6 illustrates a user device 600 according to an embodiment of the present application. As indicated above, the user device 600 is generally any device capable of providing wireless communications to the network 102 such as a wireless transmit/receive unit (WTRU), user equipment (UE), mobile station (MS), smartphone, cellular telephone or other wireless enabled computing or mobile device. The user device 600 may include one or more processing devices 602, such as a processor, a microprocessor, an application-specific integrated circuit (ASIC), a field-programmable gate array (FPGA), a dedicated logic circuitry, or combinations thereof. The user device 600 also may include a memory 604, which may include a volatile or non-volatile memory (e.g., a flash memory, a random access memory (RAM), and/or a read-only memory (ROM)). The memory 604 may consist of a transitory computer readable media such as a RAM, a ROM, an erasable programmable ROM (EPROM), an electrically erasable programmable ROM (EEPROM), a flash memory, a CD-ROM, or other portable memory storage. The memory 604 may store instructions for execution by the processing device(s) 602, such as to carry out the present disclosure. The memory 604 may include other software instructions, such as for implementing an operating system and other applications/functions. In one embodiment, the user device 600 includes a user interface 608 which may include various inputs/outputs 610 such as a display, audio input and output, keys, buttons, microphones or other inputs or outputs.

The user device 600 may include one or more network interfaces 620 for sending and receiving data over the network 102. The network interface 620 may includes a wireless communications interface having a transmitter 622 and receiver 624 coupled to an antenna 630. It will be appreciated that the functions of the network interface 620 and wireless communications interface may be carried out by different transceiver or modem components including multiple transmitter, receiver and antenna components or arrays. The one or more network interfaces 620 may be configured for wired or wireless communication with a network, such as but not limited to, an intranet, the Internet, a P2P network, a WAN, LAN and/or a cellular or mobile communications network such as a 5G, 4G, LTE or other network as noted above. The network interface(s) 620 may include wired links (e.g., Ethernet cable) and/or wireless links (e.g., one or more antennas) for intra-network and/or inter-network communications. The network interface(s) 620 may be configured for sending and receiving data to other user devices 110, access points 120, network nodes 112, 140, 500 in the networks 102, 104.

In some embodiments, the user device 600 is configured to sense, measure or monitor signals present in the unlicensed wireless channels and generate and transmit reports of this information to the network 102. These functions may be performed by the network interface 620, or by the network interface 620 and execution by the processing device 602 of a set of software instructions, as represented by the sensing module 640. In some embodiments, the user device 600 is configured to detect beacons or preambles, such as WiFi beacons or preambles above a carrier sensing threshold. The user device 600 may provide a report of this information to the network 102 through the network node 112, LPN 140 or network node 500 as part of its reporting at the radio resource control (RRC) level. The report may include information such as signal powers and identifiers associated with equipment 200 which may be transmitting over an unlicensed wireless channel. Based on this information, which represents the equipment 200 in the vicinity of the user device 600, a signal quality level may be determined by the controller 114, network node 112, or LPN 140 as described above. The user device 600 also may be configured to measure and generate reports of the strength of one or more downlink reference signals. These measurements and reports may be made based on reference signals received by the device 600 from one or more LPNs 140 over one or more licensed wireless channels, one or more unlicensed wireless channels, or a combination of these channels.

Figure 7:
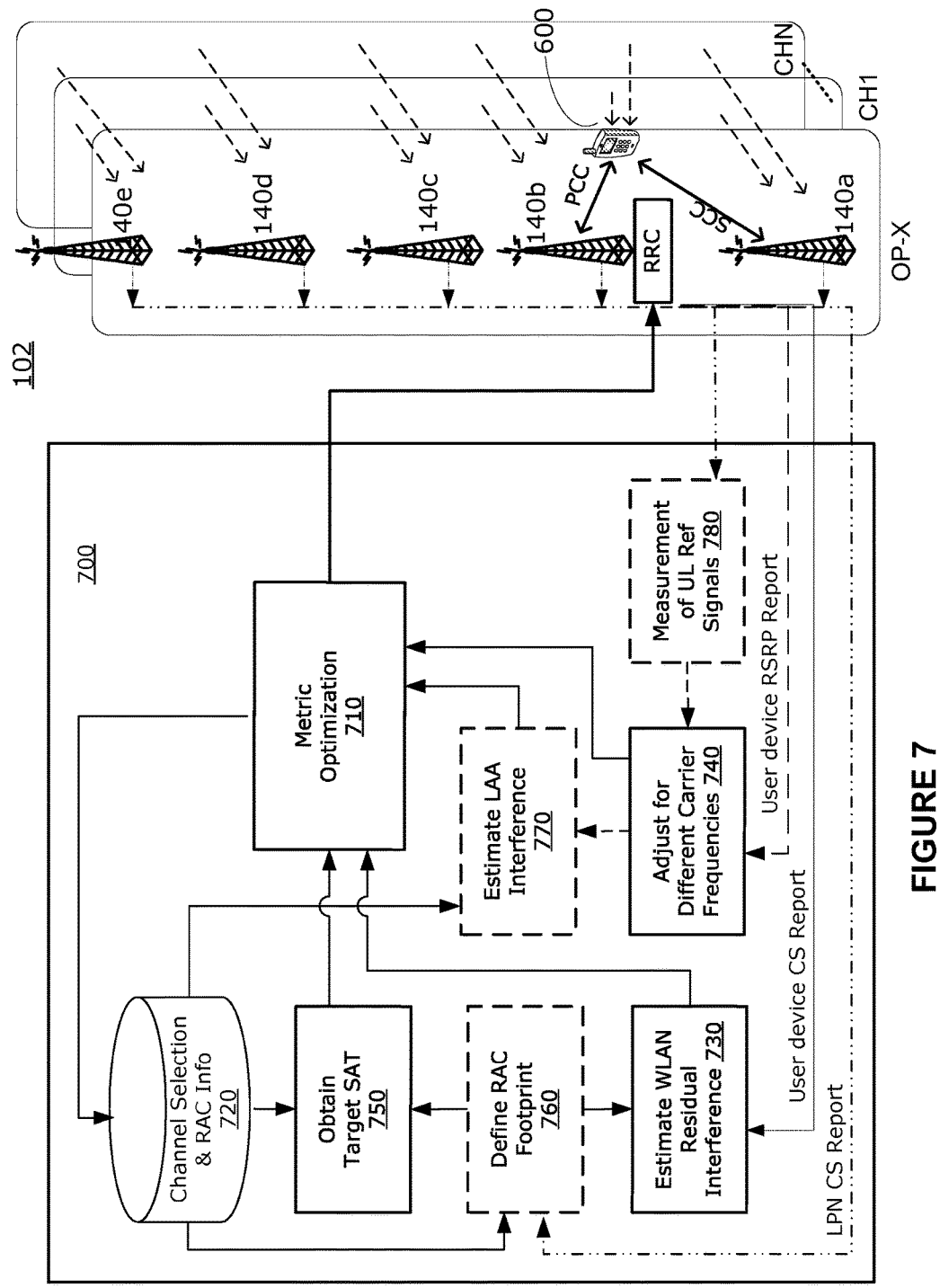
FIG. 7 is a block diagram illustrating a controller in accordance with one implementation of the present disclosure.

FIG. 7 illustrates a block diagram of a control system 700 in a network 102 to further illustrate the method 400 and embodiments described in the present application, including the integration of these functions with RRC elements in the network 102. The control system 500 may be incorporated as part of the network node 500, which is illustrated in FIG. 6 and described below, either as an LPN 140, or a network node 112 in a macro-cell. In other embodiments, the control system 700 is part of an apparatus in the backhaul network such as the controller 114. In one embodiment, the control system 700 is part of a central spectrum management controller (CSMC) which is configured to perform the selection of unlicensed wireless channels and LPNs 140 as described herein, along with other functions to support license-assisted access for 5G networks. While different blocks or functions are illustrated in FIG. 7, it will be appreciated that the method 400 could be implemented by the control system 700 by various processing devices and hardware components and execution of instructions or modules of instructions stored in a memory.

The network 102 shown in FIG. 7 is similar to FIG. 3 with five LPNs 140*a*-140*e*, which may potentially serve the user device 600, operating over licensed wireless channels managed by an operator, OP-X. While only one user device 600 and five LPNs 140 are shown, it will be appreciated that the methods and systems described herein apply to the selection of multiple channels and LPNs for multiple user devices 600 in the network 102. Each of the LPNs 140*a*-140*e* is configured to sense, measure or monitor signals in one or more unlicensed wireless channels CH1-CHN as described above and indicated by the dashed-line arrows between CH1-CHN and each LPN 140*a*-140*e*. Each of the LPNs 140*a*-140*e* may send reports, such as LPN CS Reports, of any information gathered or generated regarding these channels and signals to the control system 700, as indicated by the dashed and dotted lines in the figure. Each of the LPNs 140*a*-140*e* also may send reports regarding the measurement of uplink sounding or reference signals. The user device 600 also is configured to generate reports regarding the measured power of signals received over licensed wireless channels in the network 102, such as RSRP measurements. The user device 110 also may conduct measurements of signals received over one or more unlicensed wireless channels, including RSRP, through its network interface 620 or sensing module 640. These reports may be sent to the LPN 140*b* over a PCC as shown. In some embodiments as described above, these reports may be sent over an SCC which has been previously established over an unlicensed wireless channel which supports uplink communications, such as the SCC established between the user device 600 and the LPN 140*a*.

In the control system 700, the metric optimization block 710 represents the determination of the combined signal quality level and target time share parameter metric. The unlicensed wireless channel and LPN 140 having the best or maximum combined metric, may be selected and configured for supporting LAA services through an SCC for the user device 600. The selected channel and LPN information may be stored in a memory, as represented by the channel selection and RAC information block 720. In order to determine the signal quality level, a residual interference at the user device 600 for each potential LPN 140a-140e and unlicensed wireless channel is determined or estimated (block 730) based on reports of signals detected on the unlicensed wireless channels by the user device 600 and each potential LPN 140a-140e. The signal quality level is determined by the metric optimization block 710 based on this residual interference and received power or RSRP reports received from the user device 600. The received power measurements from the user device 600 may be adjusted to account for differences in carrier frequencies (block 740).

The target time share parameter is obtained or determined (block 750) and provided to the metric optimization block 710. As described above, where the control system 700 is part of a controller 114, the target time share parameter may be determined by the controller 114. Where the control system 700 is part of a network node 112 or LPN 140, the target time share parameter may be received by the node from a controller 114 or other network management entity. In some embodiments, the target time share parameter is preconfigured or updated dynamically. Where the network 102 supports the creation of RACs, the target time share parameter may be determined at block 750 based on the RACs which have been configured for an unlicensed channel as well as a coexistence factor which may be changed to emphasize or de-emphasize the blocked WLAN when determine the target time share parameter.

Where the network 102 supports the creation of RACs, the RAC footprint for each unlicensed wireless channel is defined (block 760) and used in determining the residual interference at the user device 600 in block 730, as described above. To estimate any additional interference at the user device due to neighbouring LPNs 140 or other networks 102 providing LAA services over the unlicensed wireless channels, an additional interference level may be determined (block 770). This determination may be made based on the measured uplink reference signals (block 780) which have been adjusted to account for differences in carrier frequencies (block 740). This determination of additional LAA interference is also made based on the information from the channel selection and RAC information block 720 which indicates which channels have been selected and configured as part of each RAC. Thus, as the channel selections and RACs are reconfigured or optimized, either periodically or as network load or device handovers require, the estimated LAA interference is updated accordingly. This additional interference is combined with the residual interference encountered by the user device 600 due to signals in the unlicensed wireless channels, such as WLAN or WiFi signals, to determine the signal quality level in the metric optimization block.

Once a selection of an unlicensed wireless channel and an LPN 140 have been determined, configuration messages may be generated to add, reconfigure and release the secondary cells and to provide the secondary cell identification number. As described above, the user device 600 may be configured through MAC layer signalling to establish and later activate the secondary carriers.

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, or simultaneously, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for selection of an unlicensed wireless channel, comprising:
   for a user device and one or more network nodes:
      determining a signal quality level associated with each of the one or more network nodes and each of two or more unlicensed wireless channels available to the user device and to that network node; and
      obtaining a target time share parameter associated with each of the two or more unlicensed wireless channels and each of the one or more network nodes;
      each target time share parameter being representative of an estimated data rate, and representing an amount of resources of a respective one of the two or more unlicensed wireless channels that is potentially available for use by a respective one of the one or more network nodes; and
   selecting an unlicensed wireless channel for use as a carrier by the user device, the unlicensed wireless channel being selected based on a metric calculated using a combination of both the signal quality level and the target time share parameter.

2. The method of claim 1, further comprising jointly selecting the unlicensed wireless channel and a network node for serving the user device, the unlicensed wireless channel and the network node being jointly selected based on both the signal quality level and the target time share parameter.

3. A method according to claim 1 wherein the signal quality level is determined based on an estimated residual interference at the user device over the unlicensed wireless channel.

4. A method according to claim 1 further comprising:
obtaining a first report of signals detected by the user device for the two or more unlicensed wireless channels available to the user device and any of the one or more network nodes;
obtaining received power measurements from the user device for at least one licensed wireless channel over which the user device operates; and
wherein for the one or more network nodes, determining the signal quality level associated with the two or more unlicensed wireless channels comprises:
 obtaining a second report of signals detected by the network node for the two or more unlicensed wireless channels available to the user device and to that network node;
 determining a residual interference at the user device for the two or more unlicensed wireless channels based on the first and second reports of signals; and
 determining the signal quality level associated with that network node and the two or more unlicensed wireless channels based on a ratio of the received power measurement to the residual interference at the user device.

5. A method according to claim 4,
wherein obtaining the first report of signals detected by the user device comprises obtaining a first report of a signal power and an equipment identifier for each signal detected by the user device over the two or more unlicensed wireless channels at or above a carrier sensing threshold, wherein equipment associated with the equipment identifiers detected by the user device comprise a first group of equipment;
wherein obtaining the second report of signals detected by the network node comprises obtaining a second report of a signal power and an equipment identifier for each signal detected by the network node over the two or more unlicensed wireless channels at or above a carrier sensing threshold, wherein equipment associated with the equipment identifiers detected by the network node comprise a second group of equipment; and
wherein determining the residual interference at the user device for each of the two or more unlicensed wireless channels based on the first and second reports of signals comprises determining an interference level from residual equipment in the first group of the equipment which are not present in the second group of the equipment.

6. A method according to claim 5 wherein the equipment comprises any combination of wireless local area network (WLAN) access points or WLAN capable transmitters, and wherein the associated equipment identifiers comprise service set identifiers (SSID).

7. A method according to claim 5 wherein two or more network nodes are associated in a radio access cluster (RAC) for scheduling communications over a particular unlicensed wireless channel, wherein equipment associated with the equipment identifiers detected by each network node in the RAC comprise a third group of equipment, and wherein determining the residual interference at the user device for that network node and the particular unlicensed wireless channel comprises determining the interference level from the residual equipment in the first group of equipment which is not present in the third group of equipment.

8. A method according to claim 7 further comprising determining an additional interference level from one or more RACs configured to use the two or more unlicensed wireless channels and wherein determining the signal quality level associated with the network node and each of the two or more unlicensed wireless channels available to the user device and to that network node comprises determining the ratio of the received power measurement to a sum of the residual interference level and the additional interference level at the user device.

9. A method according to claim 8 wherein the additional interference level is determined based on uplink sounding signals sent by the user device over the at least one licensed channel and adjusted to account for differences in frequency between the licensed wireless channel and the two or more unlicensed wireless channels.

10. A method according to claim 8 wherein the additional interference level is determined based on uplink sounding signals sent by the user device over the two or more unlicensed wireless channels.

11. A method according to claim 5 wherein the received power measurements from the user device comprise reference signal received power (RSRP) measurements obtained over a licensed wireless channel or an unlicensed wireless channel and adjusted to account for differences in frequency between the wireless channel over which the RSRP measurement is received and the two or more unlicensed wireless channels.

12. A method according to claim 2 further comprising:
for the one or more network nodes:
 determining a bandwidth share parameter associated with the network node and the two or more unlicensed wireless channels available to the user device and to that network node; and
wherein the selected unlicensed wireless channel and the selected network node are selected based on a combination of the signal quality level, the target time share parameter and the bandwidth share parameter.

13. A method according to claim 1 wherein the one or more network nodes comprises one network node serving the user device on a primary component carrier operating over a licensed wireless channel, and wherein the one network node serves the user device on a secondary component carrier operating over the selected unlicensed wireless channel.

14. A method according to claim 2 wherein the selected network node serves the user device on a secondary component carrier operating over the selected unlicensed wireless channel, and wherein a different network node serves the user device on a primary component carrier operating over a licensed wireless channel.

15. A method according to claim 1 wherein the unlicensed wireless channels are channels for a wireless local area (WLAN) network or a WiFi™ network.

16. A controller comprising:
a communications interface;
a processor; and
one or more non-transitory computer readable media having computer readable instructions stored thereon for transmitting and receiving data through the communications interface, the instructions, when executed by the processor, direct the controller to:
 for a user device and one or more network nodes in a wireless communications network:

determine a signal quality level associated with each of the one or more network nodes and each of two or more unlicensed wireless channels available to that network node and to the user device; and obtain a target time share parameter associated with each of the two or more unlicensed wireless channels and each of the one or more network nodes;

each target time share parameter being representative of an estimated data rate, and representing an amount of resources of a respective one of the two or more unlicensed wireless channels that is potentially available for use by a respective one of the one or more network nodes; and select an unlicensed wireless channel for use as a carrier by the user device, the unlicensed wireless channel being selected based on a metric calculated using a combination of both the signal quality level and the target time share parameter.

17. A controller according to claim 16 wherein the instructions, when executed by the processor, further direct the controller to jointly select the unlicensed wireless channel and a network node for serving the user device, the unlicensed wireless channel and the network node being jointly selected based on both the signal quality level and the target time share parameter.

18. A controller according to claim 16 wherein the signal quality level is determined based on an estimated residual interference at the user device over the unlicensed wireless channel.

19. A controller according to claim 16 wherein the instructions, when executed by the processor, further direct the controller to:

obtain a first report of signals detected by the user device for the two or more unlicensed wireless channels available to the user device and any of the one or more network nodes;

obtain received power measurements from the user device for at least one licensed wireless channel over which the user device operates; and wherein for the one or more network nodes, the controller is directed to determine the signal quality level associated with the two or more unlicensed wireless channels by, obtaining a second report of signals detected by the network node for the two or more unlicensed wireless channels available to the user device and to that network node;

determining a residual interference at the user device for the two or more unlicensed wireless channels based on the first and second reports of signals; and determining the signal quality level associated with that network node and two or more unlicensed wireless channels based on a ratio of the received power measurement to the residual interference at the user device.

20. A controller according to claim 19, wherein the first report of signals detected by the user device comprises a first report of a signal power and an equipment identifier for each signal detected by the user device over the two or more unlicensed wireless channels at or above a carrier sensing threshold, wherein equipment associated with the equipment identifiers detected by the user device comprise a first group of equipment;

wherein the second report of signals detected by the network node comprises a second report of a signal power and an equipment identifier for each signal detected by the network node over the two or more unlicensed wireless channels at or above a carrier sensing threshold, wherein equipment associated with the equipment identifiers detected by the network node comprise a second group of equipment; and wherein determining the residual interference at the user device for each the two or more unlicensed wireless channels based on the first and second reports of signals comprises determining an interference level from residual equipment in the first group of the equipment which are not present in the second group of the equipment.

21. A controller according to claim 17 wherein the instructions, when executed by the processor, further direct the controller to re-determine the selected unlicensed wireless channel for use as the carrier by the user device and the selected network node for serving the user device in response to a handover of the user device from a first primary cell to a second primary cell, in response to a request to offload traffic for the user device to an unlicensed wireless channel, or in response to a periodic trigger.

22. A controller according to claim 20 wherein the instructions, when executed by the processor, further direct the controller to:

associate two or more network nodes in a radio access cluster (RAC) for scheduling communications over a particular unlicensed wireless channel;

wherein equipment associated with the equipment identifiers detected by each network node in the RAC comprise a third group of equipment; and wherein determining the residual interference at the user device for the particular unlicensed wireless channel comprises determining the interference level from the residual equipment in the first group of equipment which is not present in the third group of equipment.

23. A controller according to claim 22 wherein the instructions, when executed by the processor, further direct the controller to: determine an additional interference from one or more RACs configured to use the two or more unlicensed wireless channels, and determine the signal quality indicator associated with the network node and each of the two or more unlicensed wireless channels available to the user device and to that network node based on the ratio of the received power measurement to a sum of the residual interference level and the additional interference at the user device.

24. A controller according to claim 23 wherein the instructions, when executed by the processor, further direct the controller to determine the additional interference level based on uplink sounding signals sent by the user device over the at least one licensed channel and adjusted to account for differences in frequency between the licensed wireless channel and the two or more unlicensed wireless channels.

25. A controller according to claim 17 wherein the instructions, when executed by the processor, further direct the controller to:

determine the signal quality level associated with the one or more network nodes and the two or more unlicensed wireless channels available to that network node and to each one of a plurality of user devices; and select an unlicensed wireless channel for use as a carrier by each of the plurality of user devices, and a network node for serving each of the plurality of user devices, the selected unlicensed wireless channel and the selected network node being selected jointly based on both the signal quality level and the target time share parameter;

wherein the selected unlicensed wireless channel and the selected network node for each of the plurality of user devices is determined periodically and sequentially in a randomly interleaved manner.

26. A controller according to claim 17 wherein the instructions, when executed by the processor, further direct the controller to:

for the one or more network nodes:
determine a bandwidth share parameter associated with the network node and the two or more unlicensed wireless channels available to the user device and to that network node; and wherein the selected unlicensed wireless channel and the selected network node are selected based on a combination of the signal quality level, the target time share parameter and the bandwidth share parameter.

* * * * *